US00RE46777E

(19) United States
(12) Reissued Patent
Narroschke et al.

(10) Patent Number: US RE46,777 E
(45) Date of Reissued Patent: Apr. 3, 2018

(54) QUANTIZATION FOR HYBRID VIDEO CODING

(71) Applicants: Matthias Narroschke, Schaafheim (DE); Hans-Georg Musmann, Salzgitter (DE)

(72) Inventors: Matthias Narroschke, Schaafheim (DE); Hans-Georg Musmann, Salzgitter (DE)

(73) Assignee: REALTIME ADAPTIVE STREAMING LLC, Bronxville, NY (US)

(21) Appl. No.: 15/013,843

(22) Filed: Feb. 2, 2016

Related U.S. Patent Documents

Reissue of:
(64) Patent No.: 8,634,462
Issued: Jan. 21, 2014
Appl. No.: 12/531,025
PCT Filed: Mar. 10, 2008
PCT No.: PCT/EP2008/052824
§ 371 (c)(1),
(2) Date: Mar. 5, 2010
PCT Pub. No.: WO2008/110535
PCT Pub. Date: Sep. 18, 2008

U.S. Applications:
(63) Continuation of application No. 11/685,566, filed on Mar. 13, 2007, now abandoned.

(51) Int. Cl.
*H04N 7/18* (2006.01)
*H04N 19/19* (2014.01)
(Continued)

(52) U.S. Cl.
CPC ..... *H04N 19/19* (2014.11); *H04N 19/12* (2014.11); *H04N 19/126* (2014.11);
(Continued)

(58) Field of Classification Search
CPC .... H04N 19/147; H04N 19/46; H04N 19/129; H04N 19/61; H04N 19/12; H04N 19/126; H04N 19/14; H04N 19/19
(Continued)

(56) References Cited

U.S. PATENT DOCUMENTS 5,371,549 A * 12/1994 Park ..... H04N 5/2624 348/402.1
5,691,770 A 11/1997 Keesman et al.
(Continued)

FOREIGN PATENT DOCUMENTS

WO 96/34495 10/1996
WO 96/34495 A2 10/1996
WO 2007079964 A1 7/2007

OTHER PUBLICATIONS

International Search Report, dated Aug. 13, 2008, for PCT/EP2008/052824, 4 pages.
(Continued)

*Primary Examiner* — Ovidio Escalante
(74) *Attorney, Agent, or Firm* — Seed IP Law Group LLP

(57) ABSTRACT

Method for coding a video signal using hybrid coding, comprising: reducing temporal redundancy by block based motion compensated prediction in order to establish a prediction error signal; performing quantization on samples of the prediction error signal or on coefficients resulting from a transformation of the prediction error signal into the frequency domain to obtain quantized values, representing quantized samples or quantized coefficients respectively; calculating a quantization efficiency for the quantized values; calculating a zero efficiency for a quantization, when the quantized values are set to zero; selecting the higher efficiency; and maintaining the quantized values or setting
(Continued)

quantized values to zero, for further proceeding, depending on the selected efficiency.

14 Claims, 8 Drawing Sheets

(51) Int. Cl.

| | |
|---|---|
| ***H04N 19/46*** | (2014.01) |
| ***H04N 19/129*** | (2014.01) |
| ***H04N 19/12*** | (2014.01) |
| ***H04N 19/126*** | (2014.01) |
| ***H04N 19/14*** | (2014.01) |
| ***H04N 19/147*** | (2014.01) |
| ***H04N 19/61*** | (2014.01) |

(52) U.S. Cl.
CPC ..... *H04N 19/129* (2014.11); *H04N 19/14* (2014.11); *H04N 19/147* (2014.11); *H04N 19/46* (2014.11); *H04N 19/61* (2014.11)

(58) Field of Classification Search
USPC ..... 375/240.04, 240.24, 240.25, 240.26
See application file for complete search history.

(56) References Cited

U.S. PATENT DOCUMENTS

| | | | | |
|---|---|---|---|---|
| 7,203,374 | B2 | 4/2007 | Hatabu | 382/248 |
| 7,352,905 | B2 * | 4/2008 | Mukerjee | H04N 19/52 375/E7.125 |
| 7,929,776 | B2 * | 4/2011 | Sethi et al. | 382/232 |
| 2002/0114392 | A1 | 8/2002 | Sekiguchi et al. | 375/240.15 |
| 2006/0098733 | A1 | 5/2006 | Matsumura et al. | |
| 2006/0233239 | A1 | 10/2006 | Sethi et al. | |
| 2007/0009044 | A1 * | 1/2007 | Tourapis | H04N 19/176 375/240.25 |
| 2007/0047648 | A1 * | 3/2007 | Tourapis | H04N 19/176 375/240.13 |
| 2007/0133891 | A1 | 6/2007 | Jeong | |
| 2010/0220784 | A1 | 9/2010 | Tanimoto et al. | |

OTHER PUBLICATIONS

Written Opinion, dated Aug. 13, 2008, for PCT/EP2008/052824, 8 pages.

Lim et al., "Text Description of Joint Model Reference Encoding Methods and Decoding Concealment Methods," Study of ISO/IEC 14496-10 and ISO/IEC 14496-5/AMD6, Mar. 2004, pp. 2-45.

Narroschke, "Adaptive coding of the prediction error for H.264/AVC," Institut für Informationsverarbeitung Universität Hannover, Dec. 2, 2005, 15 pages.

Narroschke et al., "Adaptive prediction error coding in spatial and frequency domain for H.264/AVC" ITU—Telecommunications Standardization Sector Study Group 16 Question 6 Video Coding Experts Group (VCEG), 29th Meeting, Bangkok, Thailand, Jan. 16-20, 2006, 14 pages.

Narroschke, "Adaptive prediction error coding in the spatial and frequency domain in the KTA reference model" International Organisation for Standardisation, Montreux, CH, Apr. 2006, 16 pages.

Narroschke, "Extending the prediction error coder of H.264/AVC by a vector quantizer" Proceedings of the SPIE, SPIE, Bellingham, WA 5960: Jul. 2005, 12 pages.

Ostermann et al., "Video coding with H.264/AVC: Tools, Performance, and Complexity" IEEE Circuits and Systems Magazine 4(1): 7-28, 2004.

* cited by examiner

QUANTIZATION FOR HYBRID VIDEO CODING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The invention relates to a method of coding, coder and decoder involving quantization for hybrid video coding and data signals.

BACKGROUND OF THE INVENTION

Up to date standardized video coding methods are based on hybrid coding. Hybrid coding provides a coding step in the time domain and a coding step in the spatial domain. First, the temporal redundancy of video signals is reduced by using a block based motion compensated prediction between the image block to be coded and a reference block from an image that has already been transmitted determined by a motion vector. The remaining prediction error samples are arranged in blocks and are transformed into the frequency domain resulting in a block of coefficients. These coefficients are quantized and scanned according to a fixed and well-known zigzag scanning scheme, which starts with the coefficient representing the DC value. According to a typical representation, this coefficient is positioned among the low frequency coefficients in the top left corner of a block. The zigzag scanning produces a one-dimensional array of coefficients, which are entropy-coded by a subsequent coder.

The coder is optimised for an array of coefficients with decreasing energy. Since the order of coefficients within a block is predetermined and fixed, the zigzag scanning produces an array of coefficients of decreasing energy, if the prediction error samples are correlated. The subsequent coding step may then be optimised for such a situation. For this purpose, the latest standard H.264/AVC proposes Context-Based Adaptive Binary Arithmetic Coding (CABAC) or Context-Adaptive Variable-Length Coding (CAVLC). However, the coding efficiency of the transform is only high, if the prediction error samples are correlated. For samples being only marginally correlated in the spatial domain, the transform is less efficient.

The spatial redundancy may be reduced by blockwise transform coding of the resulting prediction error. For the purpose of transform coding, H.264/AVC applies an integer transform for coding a macroblock of 16×16 picture elements, which is similar to the Discrete Cosine Transform. The size of the transform can be changed for each macroblock between 8×8 or 4×4 picture elements, signaled by side information. In the first case, 4 8×8 transforms and in the second case, 16 4×4 transforms are applied for the macroblock. Dependent on the size of the applied transform different quantizations procedures are performed. Most of the encoding strategies that are applied in the official reference software are described in K.-P. Lim, G. Sullivan, T. Wiegand, "Text description of Joint Model Reference Encoding Methods and Decoding Concealment Methods", Joint Video Team (JVT), doc. JVT-K049, Munich, Germany, March 2004.

In the case of an 8×8 transform the quantization is performed in the official reference software as follows. For each of the four 8×8 prediction error blocks $B_j$ (j=0, . . . , 3) of a macroblock the transform is performed resulting in a block of 8×8 coefficients $c_{k,j}$ (k=0, . . . , 63). Each coefficient is quantized by a scalar quantizer as shown in FIG. 1. The quantized coefficients $c'_{k,j}$ (k=0, . . . , 63, j=0, . . . , 3) are scanned by the well known Zigzag scan starting at the DC-coefficient resulting in a one dimensional array of 64 quantized coefficients $c'_{k,j}$.

Subsequent to these coding steps, a second quantization step is performed in order to prevent that single quantized coefficients unequal to zero in an 8×8 block are coded. The coding of these single quantized coefficients unequal to zero may require a high data rate and may reduce the distortion only marginally. For this purpose, a value $I_{k,j}$, characterizing the importance of the quantized coefficient, is associated to each of the 64 quantized coefficients. Three cases are distinguished. If a quantized coefficient has an absolute value of one, the value $I_{k,j}$ is dependent on the number $N_{k,j}$ of preceding zero coefficients. The dependency between $I_{k,j}$ and $N_{k,j}$ is shown in the following table 1:

TABLE 1

| | $N_{k,j}$ | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| $I_{k,j}$ | 3 | 3 | 3 | 3 | 2 | 2 | 2 | 2 | 2 | 2 | 2 | 2 | 1 | 1 | 1 | 1 |
| | $N_{k,j}$ | | | | | | | | | | | | | | | |
| | 16 | 17 | 18 | 19 | 20 | 21 | 22 | 23 | 24 | 25 | 26 | 27 | 28 | 29 | 30 | 31 |
| $I_{k,j}$ | 1 | 1 | 1 | 1 | 1 | 1 | 1 | 1 | 0 | 0 | 0 | 0 | 0 | 0 | 0 | 0 |

Accordingly, if a quantized coefficient has an absolute value of one and there are 3 or less preceding zero coefficients, the value characterizing the importance of the corresponding quantized coefficient is set to 3. If there are 24 or more preceding zero coefficients the value characterizing the importance of the corresponding coefficient is set to 0.

For each of the 64 quantized coefficients $c'_{k,j}$, which has an absolute value larger than one, $I_{k,j}$ is set to a very large value such as 999999. For each of the 64 quantized coefficients $c'_{k,j}$, which is zero, $I_{k,j}$ is set to zero. All 64 values $I_{k,j}$ are added resulting in the sum $$I_j = \sum_{k=0}^{63} I_{k,j}.$$

In the case that the sum $I_j$ is smaller than the threshold 5, all quantized coefficients of the 8×8 block are set to zero and consequently $I_j$ is also set to zero.

After the determination of the values $I_1$, $I_2$, $I_3$, and $I_4$ of the four 8×8 prediction error blocks $B_1$, $B_2$, $B_3$, and $B_4$ these four values are added resulting in the sum $I_{MB}$ for the whole Macroblock. In the case that $I_{MB}$ is smaller than the threshold 6, all 256 quantized coefficients of the Macroblock are set to zero.

In case of an 4×4 transform the quantization is performed as follows. Each 8×8 predication error block $B_j$ (j=0, . . . , 3) of a Macroblock is divided into four 4×4 blocks $P_{j,i}$ (j=0, . . . , 3, i=0, . . . , 3). For each of the four 4×4 blocks, the transform is performed resulting in a block of 4×4 coefficients $c_{k,j,i}$ (k=0, . . . , 15, j=0, . . . , 3, i=0, . . . 3). Each coefficient is quantized by a scalar quantizer as shown in FIG. 1. The quantized coefficients $c'_{k,j,i}$ of each of the four 4×4 blocks are zigzag scanned starting at the DC-coefficient resulting in a one dimensional array of 16 quantized coefficients $c'_{k,j,i}$.

Subsequent to these coding steps, a second quantization step is performed in order to prevent that single quantized coefficients unequal to zero in an 8×8 block are coded. In this second quantization step, all 64 quantized coefficients of the four 4×4 blocks of the 8×8 block are taken into account. For the quantization purpose, a value $I_{k,j,i}$ is associated to each of the 64 coefficients. Three cases are distinguished. If a quantized coefficient has an absolute value of one, the value $I_{k,j,i}$ is dependent on the number $N_{k,j,i}$ of preceding zero coefficients. The dependency between $I_{k,j,i}$ and $N_{k,j,i}$ is shown in the following table 2:

TABLE 2

| | $N_{k,j,i}$ | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| $I_{k,j,i}$ | 3 | 2 | 2 | 1 | 1 | 1 | 0 | 0 | 0 | 0 | 0 | 0 | 0 | 0 | 0 | 0 |

For each of the 64 quantized coefficients $c'_{k,j,i}$, which has an absolute value larger than one, $I_{k,j,i}$ is set to a very large value such as 999999. For each of the 64 quantized coefficients $c'_{k,j,i}$, which is zero, $I_{k,j,i}$ is set to zero. All 64 values $I_{k,j,i}$ are added for each 8×8 prediction error block $B_j$ resulting in the sum $$I_j = \sum_{i=0}^{3} \sum_{k=0}^{15} I_{k,j,i}.$$

In the case that the sum $I_j$ is smaller than the threshold 5, all quantized coefficients of the 8×8 block are set to zero and consequently $I_j$ is also set to zero.

After the determination of the values $I_1$, $I_2$, $I_3$ and $I_4$ of the four 8×8 prediction error blocks $B_1$, $B_2$, $B_3$, and $B_4$, these four values are added resulting in the sum $I_{MB}$ for the whole macroblock. In the case that $I_{MB}$ is smaller than the threshold 6, all 256 quantized coefficients of the macroblock are set to zero.

Accordingly, in the case of an 8×8 transform as well as in the case of an 4×4 transform coefficients of prediction error blocks are quantized and a further quantization step is performed in order to prevent that single quantized coefficients unequal to zero in a 8×8 block are coded. Therefore, rules are given for setting some coefficients to zero, which are considered to be of minor relevance, in order to significantly reduce the data rate while at the same time the distortion would only be increased marginally. However, this known procedure is unsatisfactory.

SUMMARY OF THE INVENTION

Therefore, an object of the present invention is to provide an enhanced quantization for hybrid video coding.

According to an aspect of the present invention a method is provided for coding a video signal using hybrid coding, comprising reducing temporal redundancy by block based motion compensated prediction in order to establish a prediction error signal, performing a quantization on the prediction error signal or on coefficients resulting from a transformation of the prediction error signal into the frequency domain to obtain quantized values, representing quantized samples or quantized coefficients respectively calculating a quantization efficiency for the quantized values calculating a zero efficiency for a quantization, when the quantized values are set to zero, selecting the higher efficiency and maintaining the quantized values or setting the quantized values to zero, for further proceeding, depending on the selected efficiency.

Accordingly, for reducing temporal redundancy a prediction error signal is established by block based motion compensated prediction. For the coding a quantization is fulfilled based on this prediction error signal to obtain quantized values. This quantization can be performed directly on the prediction error signal resulting in first quantized samples in the spatial domain. According to a further possibility the prediction error signal is first transformed into the frequency domain, resulting in coefficients. Subsequently, the quantization is performed on these coefficients, resulting in quantized coefficients. In a further step, the result of this quantization should be enhanced. I.e. some values (samples or coefficients) should be set to zero before being coded. This is useful for samples or coefficients respectively, that require a high data rate but may reduce the distortion_only marginally. Therefore, a quantization efficiency for the quantization is calculated. I.e. a calculation is performed, taking into account the effort and the benefit of maintaining the quantized values. This quantization efficiency is compared with a zero efficiency. The zero efficiency is calculated for the case, when the quantized values (samples or coefficients respectively) are set to zero. I.e. comparing with a zero efficiency takes into account, that the effort for coding samples or coefficients might be small but on the other hand, there is also provided a disadvantage with respect to the quality of the coded signal.

Subsequently, the quantization efficiency and the zero efficiency are compared to each other. Accordingly, if the efficiency for maintaining the quantized values of the quantization is better than the efficiency for setting all the quantized values to zero, than the quantized values are kept as they are. On the other hand, if the efficiency for setting the first quantization values to zero is better, than the corresponding quantized values are set to zero.

Accordingly, to proper decide whether to set all quantized values (samples or coefficients) to zero or to keep them as they are an efficiency is calculated for both possibilities. Accordingly, the invention provides an optimization of the quantization of samples or coefficients respectively which always selects the best out of two solutions with respect to an calculated efficiency. The method takes both possibilities to proceed into account and thus avoids selecting a choice, which is alleged to be a good choice even if the other choice turns out to be even better.

According to an aspect of the present invention the error signal comprises macroblocks. The method for coding is performed for one macroblock at a time. Each macroblock is subdivided into a plurality of subblocks. E.g. a macroblock comprises 16×16 picture elements and is subdivided into four 8×8 subblocks. The first quantization is then performed on each of these subblocks. If a transformation into the frequency domain is involved, this is performed on the subblocks before quantization.

Subsequently, for each subblock a quantization efficiency for the first quantization and a zero efficiency for a quantization are calculated, when all quantized values (samples or coefficients) are set to zero. These efficiencies are compared for each subblock, in order to decide if the quantized values of the corresponding subblock are maintained or set to zero. Subsequently, an overall quantization efficiency for the quantization of all subblocks of the macroblock and an overall zero efficiency for an overall quantization when all values (samples or coefficients) of the macroblock are set to zero are calculated. These overall efficiencies for the macroblock are compared and accordingly, quantized values for the further proceeding are determined. I.e. the quantized values are kept as they are, if the overall quantization efficiency is better than the overall zero efficiency and all the quantized values (samples or coefficients) are set to zero in the other case.

According to an aspect of the invention the calculation of the efficiency is based on a cost function. Such a cost function takes negative and positive effects of the corresponding quantization or setting to zero of values into account.

According to one aspect the cost function is based on rate distortion costs, whereby the rate distortion costs are calculated depending on the required rate on the one hand and the resulting distortion on the other hand. The required rate_for coding is the sum of all bits required for coding of the values of the corresponding block, which may include some bits for side information.

A further aspect of the invention provides, that the rated distortion costs are based on the sum of the required rate and a rated distortion. Therefore, a value for each efficiency will be obtained by adding the required rate and the distortion, whereby the distortion is weighted. The weighting of the distortion may depend on one or more parameters such as the quantizer step size. Of course, the required rate can also be rated or the required rate can be rated instead of rating the distortion.

According to an aspect of the invention the rate distortion costs $C_j$ are calculated using the equation $C_j=D_j+L*R_j$, whereby $D_j$ represents the distortion resulting from the quantization, $R_j$ represents the rate required for the coding of the quantized values, L is a Lagrange parameter and the Index j depicts the corresponding subblock. The distortion may be calculated as the sum of the squared quantization errors or the mean absolute quantization error. Of course, there are other possibilities to evaluate the distortion.

According to one aspect of the invention the method provides deciding, whether to transform the prediction error signal into the frequency domain or to maintain the prediction error signal in the spatial domain. Additionally the method provides to check a third possibility i.e. setting the values (samples or coefficients) of the prediction error signal to zero. Accordingly, the invention according to this aspect provides to select between this three possibilities. This selection is done for each block, such as a macroblock for which a prediction error signal has been generated.

If it is selected, to set the values (samples or coefficients) of the prediction error signal to zero, i.e. of the current block, the result can be handled as a prediction error signal in the spatial domain or as a transformed prediction error signal in the frequency domain.

According to one aspect of the present invention a coder for coding a video signal using hybrid coding is provided, comprising: means for reducing the temporal redundancy by block based motion compensated prediction in order to establish a prediction error signal, quantization means for quantizing the prediction error signal in order to establish quantized samples or coefficients, control means adapted to calculate and to compare a quantization efficiency and a zero efficiency in order to select the quantization resulting in the higher efficiency and to either maintain the quantized samples or quantized coefficients respectively or to set them to zero, depended on the selected quantization.

According to an aspect of the present invention, a method for coding a video signal is provided being based on hybrid coding. The method comprises the steps of reducing temporal redundancy by block based motion compensated prediction in order to establish a prediction error signal, and deciding whether to transform the prediction error signal into the frequency domain, or to maintain the prediction error signal in the spatial domain.

According to a corresponding aspect of the present invention, a coder is provided, which is adapted to apply hybrid coding of a video signal. The coder includes means for reducing the temporal redundancy by block based motion compensated prediction in order to establish a prediction error signal, and means for deciding whether to transform the prediction error signal into the frequency domain, or to maintain the prediction error signal in the spatial domain. According to this aspect of the invention, a concept and corresponding apparatuses, signals and semantics are provided to decide adaptively whether to process the prediction error signal in the frequency or in the spatial domain. If the prediction error samples have only small correlation, the subsequent steps of coding the samples may be more efficient and they would lead to a reduced data rate compared to coding the coefficients in the frequency domain. Therefore, an adaptive deciding step and adaptive control means to make the decision are implemented by the present invention. Accordingly, in view of the prediction error signal, it is decided whether to use frequency domain transform or to maintain the prediction error signal in the spatial domain. The subsequent coding mechanisms may be the same as for the frequency domain, or they may be adapted especially to the needs of the samples in the spatial domain.

According to another aspect of the invention, the method for coding a video signal, and in particular the deciding step is based on a cost function. Generally, the decision whether to use the coefficients in the frequency domain or the samples in the spatial domain may be based on various kinds of deciding mechanisms. The decision may be made for all samples within a specific portion of a video signal at once, or e.g. even for a specific number of blocks, macroblocks, or slices. The decision may be based on a cost function, as for example a Lagrange function. The costs are calculated for both, coding in the frequency domain and coding in the spatial domain. Additionally, the costs are calculated for setting the values to zero. The decision is made for the coding with lower costs.

According to another aspect of the present invention, the cost function includes the rate distortion costs for the coding in the spatial and in the frequency domain. According to still another aspect of the invention, the rate distortion costs may be calculated by the required rate and the resulting distortion weighted by a Lagrange parameter. Further, the distortion measure may be the mean square quantization error or the mean absolute quantization error.

According to an aspect of the present invention, the samples in the spatial domain may be coded by essentially the same methods as being used for the coefficients in the frequency domain. These methods may include the CABAC or CAVLC coding methods. CABAC stands for context-based adaptive binary arithmetic coding and CAVLC stands for context-adaptive variable length coding. These kinds of coding are presented in the latest standard H.264/AVC. Accordingly, only little or no adaption of the coding mechanisms is necessary, if the adaptive control means decide to switch between the frequency and the spatial domain. However, it might also be provided to use different coding schemes for the coefficients in the two domains.

According to another aspect of the invention, a method for coding a video signal is provided, which is based on hybrid coding. According to this aspect of the invention, the temporal redundancy is reduced by block based motion compensated prediction, and the samples of the prediction error signal are provided in the prediction error block in the spatial domain. The samples are scanned from the prediction error block in order to provide an array of samples in a specific order. According to this aspect of the invention it is provided that the scanning scheme is derived from a prediction error image or a prediction image. The scanning scheme according to this aspect of the invention takes account of the effect that the zigzag scan according to prior art for the frequency domain may not be the most efficient scanning order for the spatial domain. Therefore, an adaptive scanning scheme is provided, which takes account of the distribution of the samples and the magnitude of the samples in the spatial domain. The scanning scheme may preferably be based on a prediction error image or a prediction image. This aspect of the invention takes account of the most probable positions of the samples having the highest magnitude and samples being most probably zero. As the coding gain for the frequency domain is mainly based on the phenomenon that the low frequency components have larger magnitudes, and most of the high frequency coefficients are zero, a very effective, variable code length coding scheme like CABAC or CAVLC may be applied. However, in the spatial domain, the samples having the highest magnitude may be located anywhere within a block. However, as the prediction error is usually the highest at the edges of a moving object, the prediction image or the prediction error image may be used to establish the most efficient scanning order.

According to an aspect of the present invention, the gradients of the prediction image may be used to identify the samples with large magnitudes. The scanning order follows the gradients within the prediction image in their order of magnitude. The same scanning order is then applied to the prediction error image, i.e. the samples in the prediction error image in the spatial domain.

Further, according to still another aspect of the present invention, the scanning scheme may be based on a motion vector in combination with the prediction error image of the reference block. The scan follows the magnitudes of the prediction error in decreasing order.

According to one aspect of the invention, the scanning scheme is derived from a linear combination of the gradient of the prediction image and the prediction error image of the reference block in combination with a motion vector.

According to another aspect of the present invention, a specific code for the coding mechanisms, as for example CABAC or the like is used based on separately determined probabilities for the coefficients in the frequency domain or the samples in the spatial domain. Accordingly, the well-known prior art coding mechanisms may be adapted at least slightly in order to provide the most efficient coding mechanism for the spatial domain. Accordingly, the switching mechanism being adaptively controlled in order to code either in the spatial or in the frequency domain may be further adapted to switch the subsequent coding steps for the samples or coefficients in the respective domains.

According to an aspect of the present invention, a method for coding a video signal is provided including a step of quantising the prediction error samples in the spatial domain by a quantizer, which has either subjectively weighted quantization error optimisation or mean squared quantization error optimization. According to this aspect of the invention, the quantizer used for quantising the samples in the spatial domain may be adapted to take account of the subjectively optimal visual impression of a picture. The representative levels and decision thresholds of a quantizer may then be adapted based on corresponding subjective or statistical properties of the prediction error signal.

Further, the present invention relates also to a decoding method and a decoding apparatus in accordance with the aspects set out here above. According to an aspect of the present invention, a decoder is provided including adaptive control means for adaptively deciding whether an input stream of a coded video signal represents the prediction error signal of the coded video signal in the spatial domain or in the frequency domain. Accordingly, the decoder according to this aspect of the present invention is adapted to decide for an incoming data stream, i.e. whether the prediction error signal is coded in the frequency or in the spatial domain. Further, the decoder provides respective decoding means for each of the two domains, either the spatial or the frequency domain.

Further, according to still another aspect of the present invention, the decoder comprises a scan control unit for providing a scanning order based on a prediction signal or a prediction error signal. The scan control unit according to this aspect of the invention is adapted to retrieve the necessary information about the scanning order, in which the incoming samples of a block have been scanned during coding the video signals. Further, the decoder may comprise all means in order to inverse quantise and inverse transform the coefficients in the frequency domain or to inverse quantise the samples in the spatial domain. The decoder may also include a mechanism to provide motion compensation and decoding. Basically, the decoder may be configured to provide all means in order to implement the method steps corresponding to the coding steps explained here above.

According to still another aspect of the present invention, a data signal representing a coded video signal is provided, wherein the coded information of the prediction error signal in the data signal is partially coded in the spatial domain and partially coded in the frequency domain. This aspect of the invention relates to the coded video signal, which is a result of the coding mechanisms as set out above.

Further, according to still another aspect of the invention, the data signal may include side information indicating the domain in which a slice, a macroblock, or a block is coded, in particular information whether a slice, a macroblock or a block is coded in the spatial or in the frequency domain. As the adaptive control according to the present invention provides that the prediction error signal is either coded in the spatial domain or in the frequency domain, it is necessary to include corresponding information into the coded video signal. Therefore, the present invention provides also a specific information, which indicates the domain in which the specific portion, such as a slice, macroblock, or block has been coded. Further, this aspect of the invention takes also account of the possibility that a whole macroblock or a whole slice may be coded only in one of the two domains. So, if for example an entire macroblock is coded in the spatial domain, this may be indicated by a single flag or the like. Further, even a whole slice may be coded only in the frequency or in the spatial domain, and a corresponding indicator could be included for the whole slice into the data stream. This results in a decreased data rate and a more efficient coding mechanism for the side information.

BRIEF DESCRIPTION OF THE DRAWINGS

The aspects of the present invention are explained with respect to the preferred embodiments which are elucidated by reference to the accompanying drawings.

DETAILED DESCRIPTION OF THE INVENTION

Figure 1:
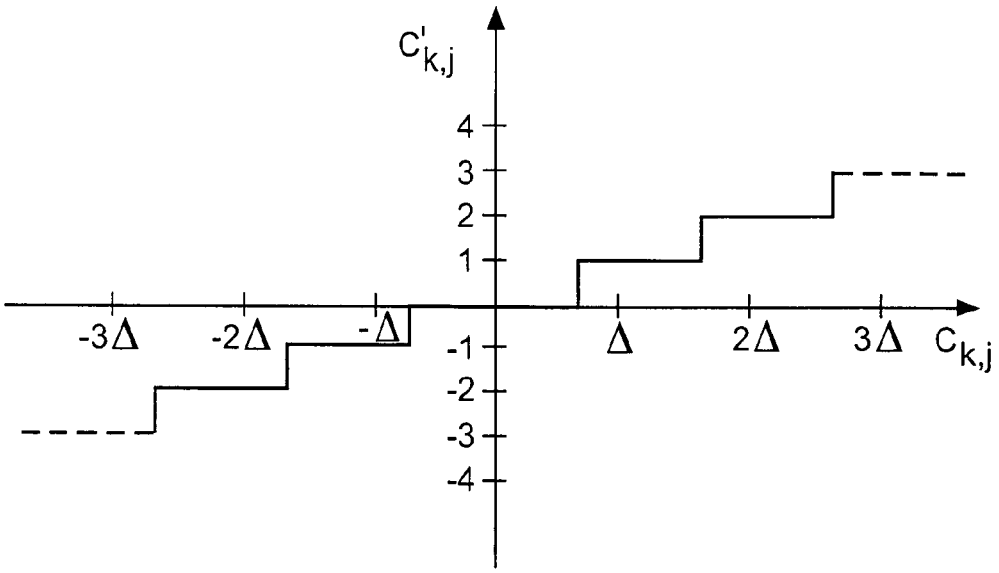
FIG. 1 shows an illustration of the quantizer which is applied to the coefficients in the standard H.264/AVC according to the state of the art.
Figure 2:
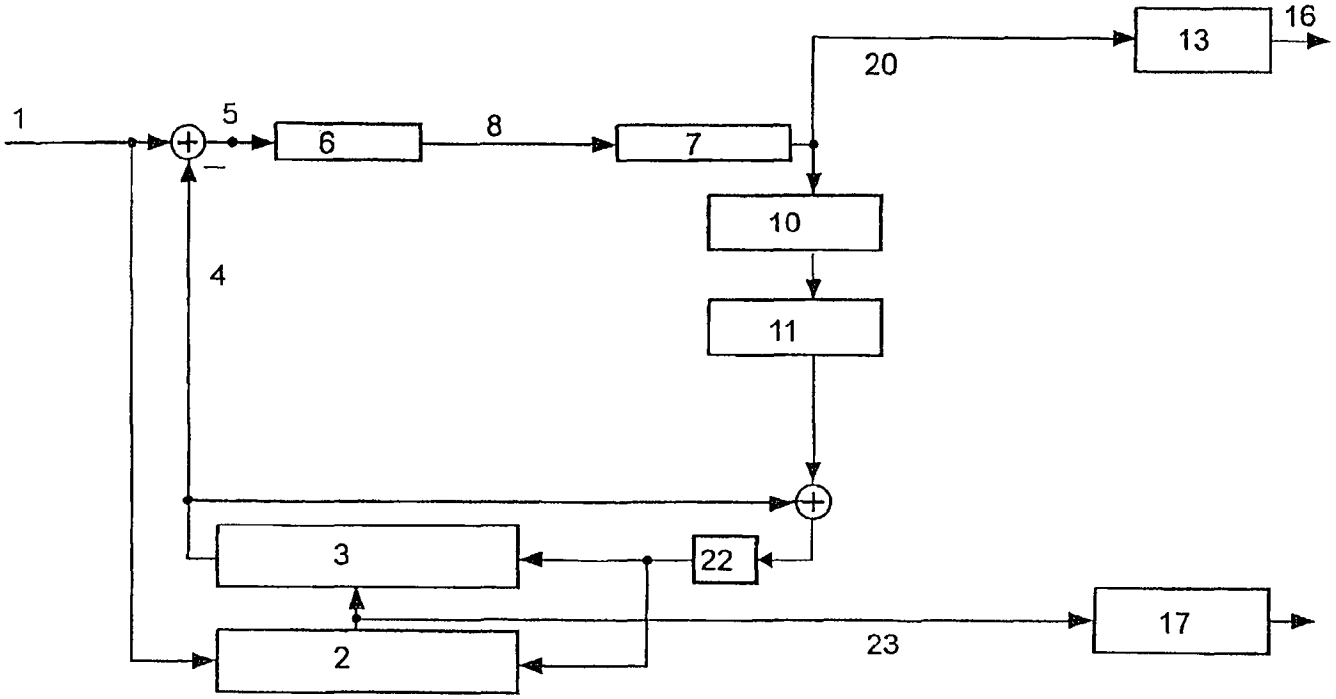
FIG. 2 shows a simplified block diagram of an encoder according to a first aspect of the present invention.

According to FIG. 2, a prediction signal 4 is subtracted from the input signal 1 to provide the prediction error signal 5. The prediction error signal 5 is transformed by the transformation block 6 into the signal 8 in the frequency domain. Signal 8 is quantized in block 7. The quantized signal 20 is input to the entropy coder 13 for encoding, whereby the entropy coder 13 outputs the coded signal 16 to be transmitted, stored, or the like. The quantized signal 20 is also inverse quantized in block 10, passed to block 11 to be inverse transformed back into the spatial domain. Subsequently, the signal output of block 11 is further used for providing a subsequent prediction signal 4. The frame memory 22, motion compensation prediction block 3, the motion estimation block 2 as well as block 17 for encoding the motion information is equal to the blocks 122, 103, 102 and 117 according to FIG. 4.

According to the present invention, the quantization block 7 performs an enhanced quantization. Two general embodiments are described below in detail. However, the invention is not restricted to these embodiments.

In both cases a prediction error signal 5 is provided, comprising macroblocks having 16×16 picture elements. A 16×16 macroblock is according to one embodiment subdivided in four 8×8 blocks or according to a further embodiment into 16 4×4 blocks. In the first step, each 8×8 block or each 4×4 block respectively is transformed into the frequency domain by means of the transformation block 6. Accordingly, the signal 8 comprises transformed 8×8 blocks or 4×4 blocks respectively. Subsequently, a first quantization of these 8×8 blocks or 4×4 blocks is performed within the quantization block 7, which further performs the enhanced quantization.

In case of an 8×8 transformation, the method according to an embodiment of the invention operates as follows.

For each of the four 8×8 prediction error blocks $B_j$ ($j=0, \ldots, 3$) of a macroblock the transform and the first step of the quantization is performed in the same way as described in the state of the art. In this invention, the subsequent quantization step is enhanced.

For this purpose, the rate distortion costs $C_j=D_j+L\cdot R_j$ are calculated for each 8×8 block. $R_j$ is the required rate, $D_j$ the resulting distortion, and L a Lagrange parameter. As distortion measure, the sum of the squared quantization errors is used, but also other measures are possible, e.g. the mean absolute quantization error. As a Lagrange parameter L, the commonly used Lagrange parameter for the coder control of H.264/AVC is applied: $L=0.85\cdot 2^{(QP-12)/3}$. QP is the quantization parameter which controls the quantizer stepsize Δ. Alternative methods for determining the rate distortion costs are possible. These costs are compared to the costs $C_j$ which result if all quantized coefficients of the 8×8 prediction error block are set to zero. The quantization resulting in lower costs is chosen.

After the determination of the costs $C_1$, $C_2$, $C_3$, and $C_4$ of the four 8×8 blocks of a macroblock, the sum of the four costs $C_{MB}$ is calculated. This sum is compared to the costs which result if all quantized coefficients of the macroblock are set to zero. Again, the quantization with lower costs is chosen.

In case of an 4×4 transformation the method according to an embodiment of the present invention operates as follows.

For each of the sixteen 4×4 prediction error blocks $B_j$ ($j=0, \ldots, 15$) of a macroblock the transform and the first step of the quantization is performed in the same way as described in the state of the art. In this invention, the subsequent second quantization step is enhanced.

For this purpose, the rate distortion costs $C_j=D_j+L\cdot R_j$ are calculated for each 4×4 block. $R_j$ is the required rate, $D_j$ the resulting distortion, and L a Lagrange parameter. As distortion measure, the sum of the squared quantization errors is used, but also other measures are possible, e.g. the mean absolute quantization error. As a Lagrange parameter L, the commonly used Lagrange parameter for the coder control of H.264/AVC is applied: $L=0.85\cdot 2^{(QP-12)/3}$. QP is the quantization parameter which controls the quantizer stepsize Δ. Alternative methods for determining the rate distortion costs are possible. These costs are compared to the costs $C_j$ which result if all quantized coefficients of the 4×4 prediction error block are set to zero. The quantization resulting in lower costs is chosen.

After the determination of the costs $C_1$ to $C_{16}$ of the sixteen 4×4 blocks of a macroblock, the sum of the sixteen costs $C_{MB}$ is calculated. This sum is compared to the costs which result if all quantized coefficients of the macroblock are set to zero. Again, the quantization with lower costs is chosen.

According to these embodiments, for each 8×8 block or for each 4×4 block respectively the rate distortion costs are calculated and compared to the case, when all coefficients of the corresponding block are set to zero. According to each comparison the coefficients of the corresponding block are either maintained or set to zero. Additionally, the corresponding rate distortion costs of each block are kept for further calculation. I.e. for each block if the coefficients are maintained as a result of the comparison the rate distortion costs corresponding to maintaining the coefficients is kept for further consideration, whereas the rate distortion costs for setting the coefficients to zero is dismissed. On the other hand, if the decision was to set the coefficients to zero, also the rate distortion costs corresponding to the choice of setting the coefficients to zero is kept for further consideration.

When all four 8×8 blocks or all 16 4×4 blocks have been considered and a decision as described above has been taken, a final check on all four 8×8 blocks or all 16 4×4 blocks respectively will be performed. Therefore, the distortion costs which have been kept for further consideration are added to get one value. This value is compared to rate distortion costs for all coefficients of the current macroblock being set to zero.

Figure 3:
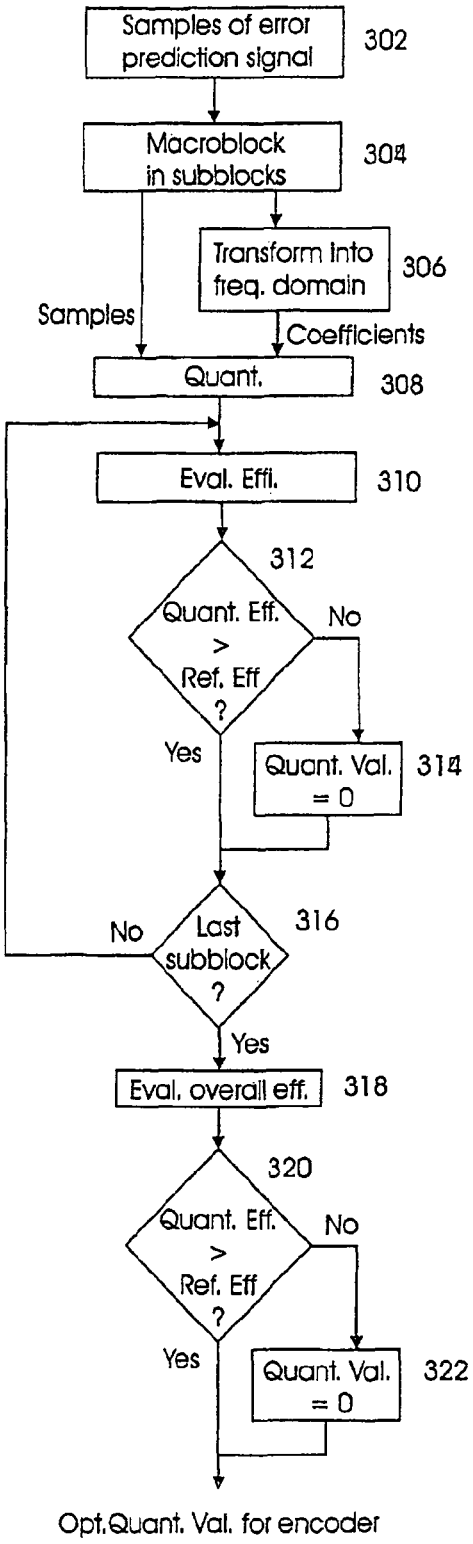
FIG. 3 shows a flow chart illustrating enhanced quantization according to one aspect of the current invention.

FIG. 3 illustrates a method for quantization according to one aspect of the invention. The illustrated method starts at step 302 providing samples of an error prediction signal. These signals are given in a macroblock, which is subdivided in subblocks in step 304. A macroblock may have the size of 16×16 picture elements and may be subdivided in four subblocks of the size 8×8 or in 16 subblocks of the size 4×4.

The method illustrated in FIG. 3 can basically be performed in the spatial domain or in the frequency domain. For computation in the frequency domain, each subblock is transformed into the frequency domain, resulting in a plurality of coefficients. These coefficients are usually also given in a matrix of the same size as the corresponding subblock. I.e. an 8×8 subblock or a 4×4 subblock in the spatial domain is transformed into the frequency domain resulting in a block of 8×8 or 4×4 coefficients respectively.

In step 308, a first quantization is performed either on the samples, if the computation is performed in the spatial domain or on the coefficients, if the calculation is performed in the frequency domain.

The computation in step 308 results in first quantized values. These first quantized values represent first quantized samples, if the quantization is performed in the spatial domain. If the quantization is performed in the frequency domain, the first quantized values represent first quantized coefficients. The following steps of the quantization are similar for first quantized samples and first quantized coefficients. Accordingly, the term quantized value represents both alternatives.

According to step 310, a quantization efficiency is calculated for the first quantized values for the current subblock. In step 310 there is also calculated a zero efficiency for the current subblock when all values of the current subblock are set to zero.

In step 312 the quantization efficiency is compared to the zero efficiency. If the quantization efficiency is not higher than the zero efficiency, than all quantized values of the current subblock are set to zero in step 314. Otherwise, the quantized values are maintained as they are.

In step 316 it is checked, whether the first optimization according to steps 310-314 has already been performed for all subblocks. Accordingly, the process is branched back to calculating the efficiency in step 310, if steps 310-312 have not yet been performed for all subblocks including the last subblock. If the last subblock has been reached, the first optimization is complete. Subsequently, an overall efficiency is calculated for all subblocks of the macroblock according to step 318. Therefore, an overall efficiency is calculated for all the subblocks based on the result of the efficiency comparison in step 312. I.e. for each subblock the best efficiency according to the comparison in step 312 is added to the best efficiencies of the other subblocks of the macroblock in step 318. Additionally, an overall zero efficiency for the macroblock is also calculated in step 318, whereby all values of the macroblock are set to zero.

The overall quantization efficiency and the overall zero efficiency are compared in step 320. If the overall quantization efficiency is not higher than the overall zero efficiency, then all quantized values of the macroblock are set to zero in step 320. Otherwise, all quantized values are maintained as they are.

Accordingly, with receiving these quantized values according to the comparison of step 320 illustrated in FIG. 3 the optimization of the quantization for the current macroblock is complete. The quantized values thus received may be transmitted to a coder e.g. an entropy coder for encoding.

Figure 4:
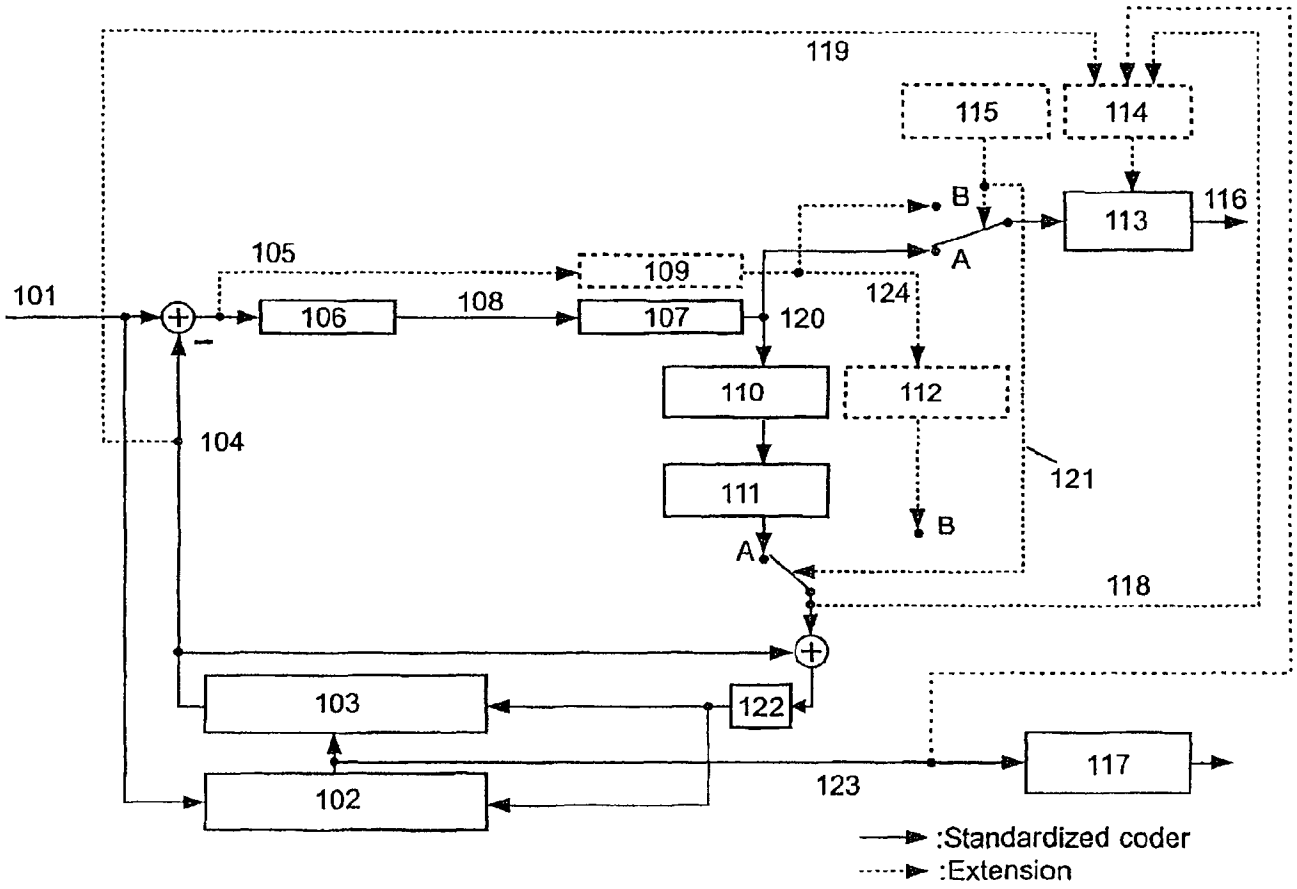
FIG. 4. shows a simplified block diagram of an encoder implementing aspects according to the present invention.

FIG. 4 shows a simplified block diagram of an encoder according to the present invention. Accordingly, the input signal 101 undergoes a motion estimation based on which a motion compensation prediction is carried out in order to provide a prediction signal 104, which is subtracted from the input signal 101. The resulting prediction error signal 105 is transformed into the frequency domain 106 and quantized by an optimised quantizer 107 for the frequency related coefficients. The output signal 120 of the quantizer 107 is passed to an entropy coder 113 which provides the output signal 116 to be transmitted, stored, or the like. By means of an inverse quantization block 110 and inverse transformation block 111, the quantized prediction error signal 120 is further used for the next prediction step in the motion compensated prediction block 103. The inverse quantized an inverse DCT transformed prediction error signal is added to the prediction signal and passed to frame memory 122 storing preceding images for the motion compensation prediction block 103 and the motion estimation block 102. Generally, the present invention suggests to use in addition to the prior art an adaptively controlled mechanism 115 to switch between the frequency and the spatial domain for transforming the prediction error signal 105. The adaptive control means 115 produce signals and parameters in order to control the adaptive change between the frequency and the spatial domain. Accordingly, an adaptive control information signal 121 is asserted to the two switches switching between the positions A and B. If the transformation is carried out in the frequency domain, the two switches are in position A. If the spatial domain is used, the switches are switched to position B. Further, the side information signal 121, i.e. which of the domains has been used for the coding procedure of a picture is also passed to the entropy coder 113. Accordingly, an appropriate information for the device is included into the data stream. Parallel to the frequency transform, via an alternative path, the prediction error signal 105 is passed to the quantizer 109. This quantization block 109 provides optimised quantization for the prediction error signal 105 in the spatial domain. The quantized prediction error signal 124 in the spatial domain may be passed to a second inverse quantization block 112 and further to the back connection to the motion compensation prediction block 103. Additionally, there is a scan control block 114 receiving either the motion vector 123 and the inverse quantized prediction error signal 118, or the prediction signal 104 via connection 119. Block 117 serves to encode the motion information.

The adaption control block 115 decides whether a block is to be coded in the frequency or in the spatial domain, and it generates corresponding side information to indicate the domain. The decision made by the adaption control means is based on the rate distortion costs for the coding in the spatial and for coding in the frequency domain. The domain having the lower rate distortion costs is selected for coding. For example, the rate distortion costs C are calculated by the required rate R and the resulting distortion D weighted by a Lagrange parameter L: C=L*R+D. As a distortion measure, the mean squared quantization error may be used, but also other measures are applicable, as for example the mean absolute quantization error. As Lagrange parameter L, the commonly used Lagrange parameter for the coder control of H.264/AVC may be used $L=0.85*2^{((QP-12)/3)}$. Alternative methods for determining the rate distortion costs are possible.

Additionally to deciding whether a block is to be coded in the frequency or in the spatial domain, it is decided, whether the values (samples or coefficients) of the corresponding block are all set to zero or not. This decision is also based on the rate distortion costs, but which are calculated for the case, when all values of the corresponding block are set to zero. Accordingly, there are at least three rate distortion costs calculated. I.e. the rate distortion costs for the coding in the spatial domain, the rate distortion costs for the coding in the frequency domain and the rate distortion costs for the case when all values are set to zero. The resulting three calculated costs are compared and the coding resulting in the lowest rate distortion costs is selected. For the case, that costs are identical, setting all values to zero is preferred and then performing the coding in the spatial domain is preferred.

The calculation of the rate distortion costs can be understood as part of the quantization and accordingly, according to one possibility, the calculation of the rate distortion costs for the coding in the spatial domain can be performed in block 109, the calculation of the rate distortion costs for the coding in the frequency domain can be performed in the block 107 and the calculation for the case of setting the values to zero can be performed in the block 107 or in the block 109.

According to an aspect of the invention, in particular when a good prediction signal 104 is expected, only coding in spatial domain could be performed, a coder would be used according to FIG. 3, whereas switches are fixed in position B and blocks 106, 107, 110 and 111 will not be used at all for this alternative. However, the quantization performed in block 109 will be enhanced by deciding depending on rate distortion costs as described above, to set values of blocks of the error prediction signal to zero or not.

The adaption control 115 can alternatively control the coding method. This may be done for example based on the prediction signal or based on the correlation in the prediction error, or based on the domain, the prediction error is coded in at a motion compensated position of already transmitted frames.

Figure 5:
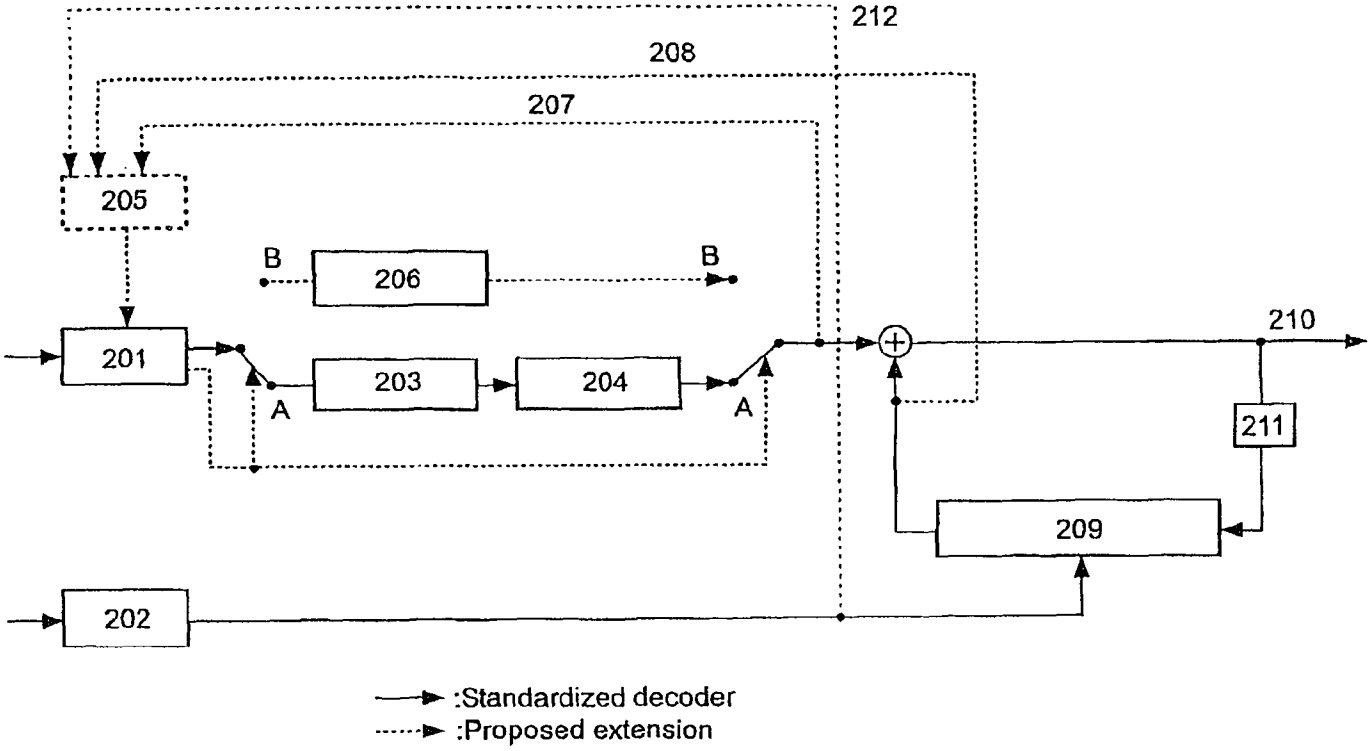
FIG. 5 shows a simplified block diagram of a decoder implementing aspects of the present invention.

FIG. 5 shows a simplified block diagram of an architecture of a decoder according to aspects of the present invention. Accordingly, the coded video data is input to two entropy decoding blocks 201 and 202. The entropy decoding block 202 decodes motion compensation information, such as motion vectors etc. The entropy decoding block 201 applies the inverse coding mechanism used in the coder, as for example decoding according to CABAC or CAVLC. If the encoder uses a different coding mechanism for the coefficients or the samples in the spatial domain, the corresponding decoding mechanism is to be used in the corresponding entropy decoding blocks. Accordingly, the entropy decoding block 201 produces the appropriate signals in order to switch between positions A and B in order to use either the appropriate inverse quantization path for the spatial domain, i.e. the inverse quantization operation block 206, or the appropriate blocks according to switch position A, i.e. the inverse quantization block 203 and the inverse transform block 204. If the prediction error is represented in the frequency domain, inverse quantization block 203 and inverse transformation block 204 apply the corresponding inverse operations. As the samples in the spatial domain have been arranged in a specific order in accordance with a scan mechanism according to aspects of the present invention, a scan control unit 205 provides the correct order of the samples for the entropy decoding block 201. If the encoding has been carried out in the spatial domain, the inverse transform block 204 and the inverse quantization block 203 are bypassed by an inverse quantization operation in block 206. The switching mechanism, to switch between frequency and spatial domain (i.e. position A and B of the switches) is controlled by the side information sent in the bitstream and decoded by the entropy decoding block 201. Further, the inverse quantized signal in the spatial domain, or the inverse quantized and inverse transformed signal in the frequency domain are summed with the motion compensated prediction picture in order to provide the decoded video signals 210. The motion compensation is carried out in block 209 based on previously decoded video signal data (previous pictures) and motion vectors. The scan control unit 205 uses either the prediction image 208, or the prediction error signal 207 in combination with the motion vector 212 to determine the correct scan sequence of the coefficients. The scan mechanism may also be based on both pictures, i.e. the prediction error picture and the prediction picture. As explained for the coding mechanism with respect to FIG. 4, the scan sequence during coding may be based on a combination of the prediction error information 207 and the motion compensation vectors. Accordingly, the motion compensation vectors may be passed via a path 212 to the scan control unit 205. Further, in correspondence to FIG. 4, there is a frame memory 211 storing the necessary and previously decoded pictures.

Figure 6:
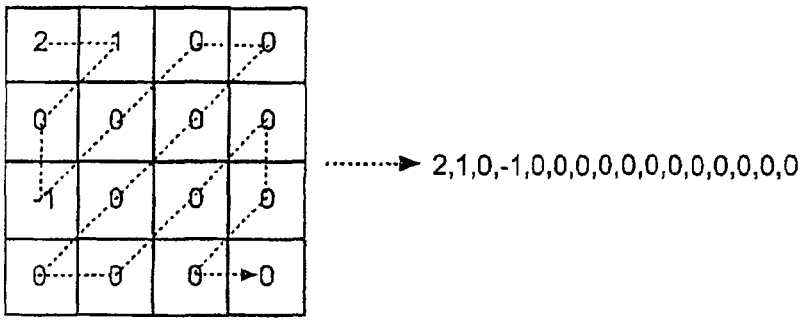
FIG. 6 shows a scanning scheme according to the prior art.

FIG. 6 shows a simplified diagram in order to illustrate the zigzag scan order according to the prior art. Accordingly, the coefficients, which are the result of a transform to the frequency domain (for example DCT) are arranged in a predetermined order as shown in FIG. 6 for a four by four block. These coefficients are read out in a specific order, such that the coefficients representing the low frequency portions are located in the first left positions of a one-dimensional array. The more on the bottom right of the array, the higher the corresponding frequencies of the coefficients. As blocks to be coded often contain substantial low frequency coefficients, the high frequency coefficients, or at least a majority of high frequency coefficients are zero. This situation can effectively be used to reduce the data to transmit it by for example replacing large sequence of zeros by a single information about the number of zeros.

Figure 7:
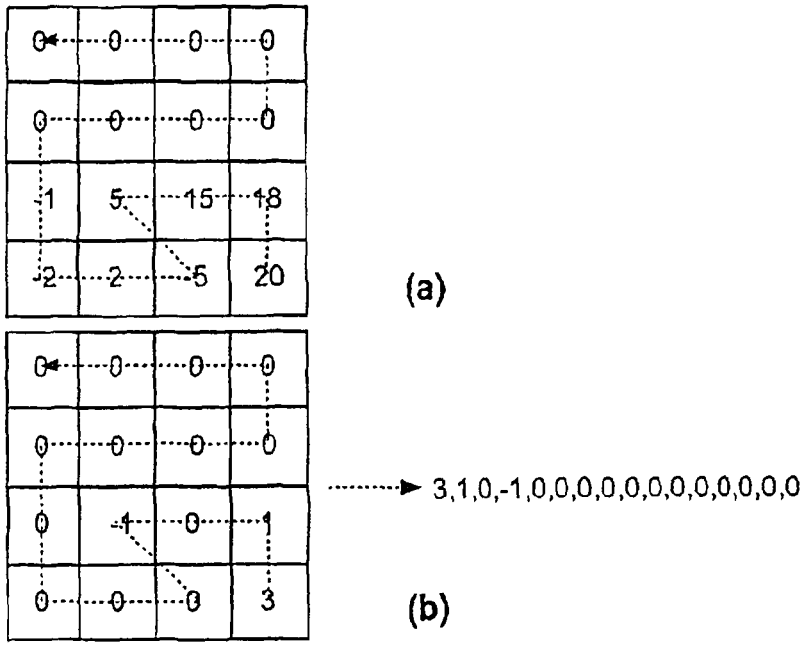
FIG. 7 shows scanning schemes according to the present invention.

FIG. 7 shows a simplified illustrative example for a scan mechanism according to an aspect of the present invention. FIG. 7(a) shows the magnitude of the gradients in the prediction image for one block. The values in each position of the block represent the gradient of the prediction image of the current block. The gradient itself is a vector consisting of a two components representing the gradient in horizontal and vertical direction. Each component may be determined by the difference of the two neighbouring samples or it may be determined by the well-known Sobel-operator taking six neighbouring samples into account. The magnitude of the gradient is the magnitude of the vector. If two values have the same magnitude, a fixed or predetermined scan order may be applied. The scanning order follows the magnitude of the gradient values in the block as indicated by the dotted line. Once the scanning order within the gradient prediction image is established, the same scanning order is applied to the quantized prediction error samples, which are shown in FIG. 7(b). If the quantized samples in the spatial domain of the block shown in FIG. 7(b) are arranged in a one-dimensional array as indicated on the left side of FIG. 7(b) in accordance with the scanning order established based on the magnitude of the gradients in the prediction image, the samples having a high value are typically arranged first in the array, i.e. in the left positions. The right positions are filled with zeros as indicated in FIG. 7(b).

Instead of a scan controlled by the gradient, also other scans as e.g. a predefined scan or a scan controlled by the quantized prediction error of already transmitted frames in combination with a motion vector, or combinations thereof can be applied (the scan control relates to blocks 114 or 205 as explained with respect to FIG. 4 and FIG. 5). In the case of a scan controlled by the prediction error signal in combination with a motion vector, the scan follows the magnitudes of the quantized prediction error samples of the block, the motion vector of the current block refers to, in decreasing order.

If the motion vector points to fractional sample positions, the required quantized prediction error samples may be determined using an interpolation technique. This may be the same interpolation technique as used for the interpolation of the reference image in order to generate the prediction samples.

In the case the scan is controlled by the combination of the prediction image and the prediction error image in combination with a motion vector, linear combinations of the magnitudes of the gradients and of the quantized prediction error samples of the block, the motion vector of the current block refers to, are calculated. The scan follows the values of these linear combinations. In addition, the method for the scan determination can be signalled for segments of the sequence, e.g. for each frame or for each slice or for a group of blocks. According to the typical standard processing, the motion compensation vectors are already considered, while the prediction image is determined.

According to another aspect of the present invention, the scanning order may also be based on the prediction error picture in combination with a motion vector. Further, combinations of the gradient principle as explained above and the prediction error picture are conceivable.

Figure 8:
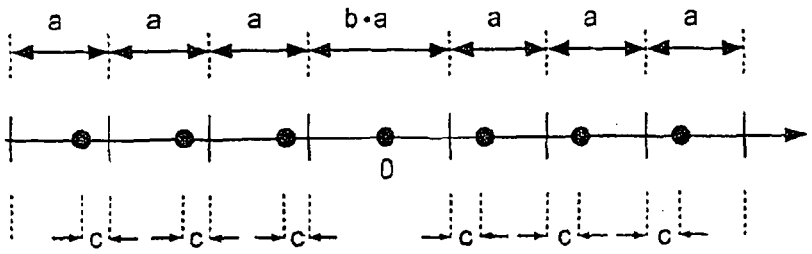
FIG. 8 illustrates the parameters used for an optimized quantizer according to the present invention.

FIG. 8 shows a simplified illustration being useful to illustrate the definition of an optimised quantizer according to aspects of the present invention. Accordingly, the three parameters a, b, and c are the parameters used to adapt the quantizer. According to the standard H.264/AVC, rate distortion optimised quantizers for the coefficients with two different distortion measures are applied. The first measure is the mean squared quantization error, the second is the subjectively weighted quantization error. According to the H.264/AVC standard, two quantizers for the prediction error samples are developed. Since the distribution of the prediction error is close to a Laplacian distribution, scalar a dead-zone plus uniform threshold quantizer is used in the case of mean squared quantization error optimisation. FIG. 5 illustrates the parameters a, b, and c of the quantization and inverse quantization.

Table 3 shows the parameters a, b, and c, which may be advantageously used for the commonly used QPs (Quantization Parameter) in the H.264/AVC coding scheme. The parameters a, b, c are the respective optimised parameters for mean square quantization error optimisation. However, this is only an example, and different or additional parameters may be useful for different applications.

TABLE 3

| | Mean squared quantization error optimisation | | | Subjectively weighted quantization error optimisation | | | | |
|---|---|---|---|---|---|---|---|---|
| QP | a | b | c | $r_1$ | $r_2$ | $r_3$ | $r_4$ | $r_5$ |
| 23 | 9.6 | 1.6 | 2.7 | 0 | 11 | 28 | 46 | 66 |
| 26 | 14.8 | 1.4 | 4.8 | 0 | 14 | 36 | 58 | 110 |
| 29 | 22.2 | 1.4 | 6.9 | 0 | 20 | 54 | 92 | 148 |
| 32 | 30.2 | 1.4 | 9.3 | 0 | 28 | 76 | 130 | 220 |

For subjectively weighted quantization error optimisation, a non-uniform quantizer is proposed with representative levels $r_i$, $-r_i$ and decision thresholds in the middle of adjacent $r_i$ which are also shown in table 3. If large prediction errors occur at the edges, visual masking may be exploited. Accordingly, large quantization errors may be allowed at the edges and small ones if the image signal is flat. H.264/AVC may use more than 4 QPs as shown in Table 3. Then Table 3 has to be extended. H.264/AVC may use 52 different QPs. The basic idea for determining the appropriate representative values $r_i$, $-r_i$ is explained here below with respect to FIG. 9.

Figure 9:
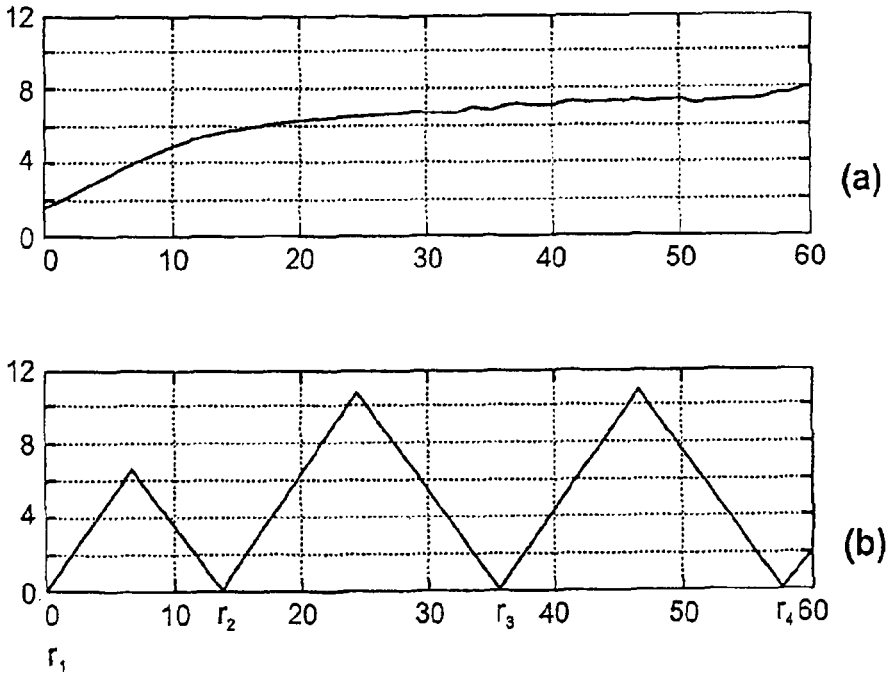
FIG. 9 shows a simplified representation of the measured mean absolute reconstruction error.

FIG. 9 shows a simplified representation of the measured mean absolute reconstruction error of a picture element in the case of the subjectively weighted quantization in the frequency domain in FIG. 9(a) and in the spatial domain in FIG. 9(b). The measured mean absolute reconstruction error of subjectively weighted quantization in the frequency domain is shown as a function of the absolute value of the prediction error. For the absolute reconstruction error of subjectively weighted quantization in the spatial domain, the representation levels $r_i$ are adjusted such that the mean absolute reconstruction error is the same for quantization in the frequency and spatial domain with respect to the quantization intervals in the spatial domain. Just as an example, the values $r_1$, $r_2$, $r_3$, and $r_4$ for QP=26 as indicated in table 3 are also present in FIG. 9(b) As a rule of thumb, a representative levels $r_i$ is approximately doubled if the value QP increases by 6. The quantizer design can also exploit other features of the visual system. Furthermore, quantizers can be used to create a quantization error with properties different to those of the H.264/AVC quantizers.

Entropy Coding of the Quantized Samples in the Spatial Domain

According to an aspect of the present invention, entropy coding in the spatial domain may be based on the same methods as for the quantized coefficients in the frequency domain. For the H.264/AVC standard, two preferred entropy coding methods are CABAC and CAVLC. However, according to this aspect of the present invention, instead of coding the quantized coefficients in the frequency domain, quantized samples in the spatial domain are coded by the above mentioned methods. As explained above, the scanning order may be changed in order to provide the same data reduction as for the frequency domain. As set out above, the scan in the spatial domain may be controlled by the magnitude of the gradient of the prediction image signal at the same spatial position. According to this principle, the samples to be coded are arranged in an order of decrease in gradients, as already explained with respect to FIGS. 7(a) and (b). Other scan mechanisms may also be applied as set out above. Further, separate codes, which means separate probability models in the case of CABAC, may be used for the spatial domain according to aspects of the present invention. The code and in the case of CABAC the initialisation of the probability models may be derived from the statistics of the quantized samples. The context modelling in the spatial domain may be done in the same way as in the frequency domain.

Coding of the Side Information

The adaptive control means explained with respect to FIG. 4 generates the information relating to the domain, in which a block is to be coded. The block size may be four by four or eight by eight picture elements according to the size of the transform. However, according to different aspects of the present invention, other block sizes independent of the size of the transform may be applied. According to an aspect of the present invention, the side information includes specific flags, which indicate whether the coding mechanism has adaptively been changed during coding. If for example all blocks of a slice are coded in the frequency domain, this may be indicated by a specific bit in the coded video data signal. This aspect of the invention may also relate to the blocks of a macroblock, which may all be coded in each of the two domains, or only in one domain. Further, the concept according to the present aspect of the invention may be applied to macroblocks and information may be included in the data stream which indicates whether at least one block of a macroblock is coded in the spatial domain. Accordingly, the flag Slice_FD_SD_coding_flag may be used to indicate whether all blocks of the current slice are coded in the frequency domain, or whether at least one block is coded in the spatial domain. This flag may be coded by a single bit. If at least one block of the slice is coded in the spatial domain, this may be indicated by the flag MB_FD_SD_coding_flag for each individual macroblock of the current slice, if all the blocks of the current macroblock are coded in the frequency domain, or if at least one block is coded in the spatial domain. This flag may be coded conditioned on the flags of the already coded neighbouring blocks to the top and to the left. If the last one of a macroblock is coded in the spatial domain, this may be indicated by the flag FD_or_SD-Flag for each block of the macroblock to be coded, if the current block is coded in the frequency or in the spatial domain. This flag may be coded conditioned on the flags of the already coded neighbouring blocks to the top and to the left. Alternatively, the side information may also be coded conditioned by the prediction signal or the prediction error signal in combination with a motion vector.

Syntax and Semantics

According to this aspect of the present invention, an exemplary syntax and semantics allowing the incorporation of the aspects of the present invention into the H.264/AVC coding scheme is presented. Accordingly, the flag Slice_FD_SD_coding_flag may be introduced in the slice_header as shown in table 4. The flag MB_FD_SD_coding_flag may be sent in each macroblock_layer as shown in table 5. In the residual_block_cabac it may be signalled by the flag FD_or_SD_flag if the frequency domain coding or spatial domain coding is supplied for the current block, this is shown in table 6 here below. A similar scheme may be applied in other video coding algorithms for the prediction error coding.

TABLE 4

| slice_header( ){ | C | Descriptor |
|---|---|---|
| . | | |
| . | | |
| . | | |
| Slice_FD_SD_coding_flag | 2 | u(1) |
| . | | |
| . | | |
| . | | |

TABLE 5

| Macroblock_layer( ){ | C | Descriptor |
|---|---|---|
| . | | |
| . | | |
| . | | |
| If (Slice_FD_SD_coding_flag == 1){ | | |
| MD_FD_SD_coding_flag | 2 | u(1), ae(v) |
| { | | |
| . | | |
| . | | |
| . | | |

TABLE 6

| residual_block_cabac{ | C | Descriptor |
|---|---|---|
| . | | |
| . | | |
| . | | |
| If (Slice_FD_SD_coding_flag == 1 && | | |
| MB_FD_SD_Coding_flag == 1){ | | |
| FD_or_SD_flag | ¾ | u(1), ae(v) |
| If (FD_or_SD_flag == 1)} | | |
| Code_Prediction_error_in_spatial_domain | | |
| } | | |
| else{ | | |
| Code_Prediction_error_in_frequency_domain | | |
| } | | |
| } | | |
| . | | |
| . | | |
| . | | |

We claim:

1. A method for coding a video signal using hybrid coding, comprising:

reducing temporal redundancy by block based motion compensated prediction in order to establish a prediction error signal;

performing quantization on samples of the prediction error signal or on coefficients resulting from a transformation of the prediction error signal into [the] *a* frequency domain to obtain quantized values, representing quantized samples or quantized coefficients respectively, wherein the prediction error signal includes a plurality of subblocks each including a plurality of quantized values;

calculating a first quantization efficiency for the quantized values of at least one subblock of the plurality of subblocks;

setting the quantized values of the at least one subblock to all zeroes;

calculating a second quantization efficiency for the at least one subblock while all of the quantized values are zeroes;

selecting which of the first and second quantization efficiencies is a higher efficiency; and selecting, for further proceeding, the at least one subblock with the quantized values prior to setting the quantized values of the at least one subblock to all zeroes if the first quantization efficiency is higher and selecting the at least one subblock with the quantized values set to zero, for further proceeding, if the second quantization efficiency is higher.

2. The method according to claim 1, wherein:

the prediction error signal comprises macroblocks, which are subdivided into the plurality of subblocks, performing quantization includes performing quantization on samples of the at least one subblock or the coefficients resulting from a transformation of the at least one subblock into the frequency domain respectively, and calculating the first quantization efficiency; setting the quantized values, calculating a second quantization efficiency; selecting which of the first and second quantization efficiencies is a higher efficiency; selecting, for further proceeding, the at least one subblock with the quantized values prior to setting the quantized values of the at least one subblock to all zeroes if the first quantization efficiency is higher; and selecting the at least one subblock with the quantized values set to zero, for further proceeding, if the second quantization efficiency is higher, and selecting steps are performed for each subblock, the method further comprising:

calculating an overall quantization efficiency for quantizing all subblocks of one macroblock of the macroblocks;

setting the quantized values of the one macroblock to all zeroes;

calculating an overall zero efficiency for quantizing while all quantized values of the one macroblock are set to zero;

selecting which of overall quantization efficiency and the overall zero efficiency is higher;

selecting, for further proceeding, the one macroblock with the quantized values prior to setting the quantized values of the one macroblock to all zeroes if the overall quantization efficiency is higher than the overall zero efficiency; and selecting the one macroblock with the quantized values of the one macroblock set to zero, for further proceeding, if the overall zero efficiency is higher than the overall quantization efficiency.

3. The method according to claim 1, wherein calculating the first and second quantization efficiencies is based on a cost function.

4. The method according to claim 3, wherein the cost function is based on rate distortion costs, whereby the rate distortion costs are calculated depending on [the] *a* required rate and [the] *a* resulting distortion.

5. The method according to claim 4, wherein the rate distortion costs are based on [the] *a* sum of [the] *a* distortion and [the] *a* weighted required rate.

6. The method according to claim 5, wherein the rate distortion costs $C_j$ are calculated using [the] *an* equation $C_j=D_j+L*R_j$, whereby $D_j$ represents the *resulting* distortion [resulting from the quantization], $R_j$ represents the *required* rate [required for quantization], L is a Lagrange parameter and [the Index] j depicts the corresponding subblock.

7. The method according to claim 4, wherein the *resulting* distortion is [the] *a* sum of [the] squared quantization errors or [the] *a* mean absolute quantization error.

8. The method according to claim 2, whereby the overall quantization efficiency of the on macroblock is [the] *a* sum of [the] selected efficiencies of each subblock.

9. A method for decoding a video signal using hybrid coding, wherein the video signal has been coded according to claim 1, comprising: decoding coded video data effectively in the frequency *domain* or [the] *a* spatial domain, in accordance with [the] *a* coding mechanism used for coding the video signal data.

10. The decoding method of claim 9, wherein positions of the prediction error signal samples received in a one-dimensional array are assigned to locations in a two-dimensional arrangement are determined based on a previously received prediction error signal or prediction image.

11. A coder for coding a video signal using hybrid coding, comprising:

means for reducing temporal redundancy by block based motion compensated prediction in order to establish a prediction error signal,

[quantization means for quantizing] *a quantizer that quantizes* the prediction error signal in order to establish quantized values representing samples or coefficients, wherein the prediction error signal includes a plurality of subblocks, control means for:

calculating a first quantization efficiency of at least one subblock of the plurality of subblocks;

setting the quantized values of the at least one subblock to all zeroes;

calculating a second quantization efficiency for the at least one subblock while all of the quantized values are zeroes;

selecting which of the first and second quantization efficiencies is a higher efficiency; and selecting, for further proceeding, the at least one subblock with the quantized values prior to setting the quantized values of the at least one subblock to all zeroes if the first quantization efficiency is higher and selecting the at least one subblock with the quantized values set to zero, for further proceeding, if the second quantization efficiency is higher.

12. The coder according to claim 11, further comprising: [transformation means for transforming] *a frequency transformer that transforms* picture elements of the prediction error signal from [the] *a* spatial domain into [the] *a* frequency domain.

13. A decoder for decoding a coded video signal coded by use of hybrid coding according to the method of claim 1, comprising:

adaptive control means for adaptively deciding whether an input stream of the coded video signal represents the prediction error signal of the coded video signal in [the] *a* spatial domain or in [the] *a* frequency domain and for decoding the coded video signal into a quantized prediction error signal; and an inverse quantizer configured to inverse quantize the quantized prediction error signal.

14. The method according to claim 1, wherein the calculating the first quantization efficiency; setting the quantized values; calculating the second quantization efficiency; selecting which of the first and second quantization efficiencies is a higher efficiency; selecting, for further proceeding, the at least one subblock with the quantized values prior to setting the quantized values of the at least one subblock to all zeroes if the first quantization efficiency is higher; and selecting the at least one subblock with the quantized values set to zero, for further proceeding, if the second quantization efficiency is higher are performed for each subblock.

* * * * *